United States Patent
Star et al.

[11] Patent Number: 5,949,810
[45] Date of Patent: Sep. 7, 1999

[54] LASER GUIDE LINE SYSTEM WITH CYLINDRICAL OPTIC ELEMENT

[75] Inventors: Jeffrey H. Star; Sheldon Star, both of Phoenix, Wis.

[73] Assignee: Jan A. Strand, Phoenix, Ariz.

[21] Appl. No.: 08/967,630

[22] Filed: Nov. 10, 1997

[51] Int. Cl.⁶ .................................................. H01S 3/08
[52] U.S. Cl. ................................................... 372/108
[58] Field of Search .............................. 372/108; 385/34; 359/641, 710, 819, 822

[56] References Cited

U.S. PATENT DOCUMENTS

| | | | |
|---|---|---|---|
| 3,448,404 | 6/1969 | McFarlane | 372/108 |
| 4,156,206 | 5/1979 | Comerford et al. | 372/102 |
| 4,221,483 | 9/1980 | Rando | 356/250 |
| 5,249,192 | 9/1993 | Kuizenga et al. | 372/108 |
| 5,272,707 | 12/1993 | Orlando | 372/108 |
| 5,461,790 | 10/1995 | Olstowski | 30/391 |
| 5,499,262 | 3/1996 | Nakata | 372/108 |
| 5,541,727 | 7/1996 | Rando et al. | 356/149 |

*Primary Examiner*—Rodney Bovernick
*Assistant Examiner*—Robert E. Wise
*Attorney, Agent, or Firm*—Quarles & Brady LLP

[57] ABSTRACT

A robust and simple laser guideline system provides a precisely located line image by passing a laser beam through a perpendicularly oriented transparent cylinder. The cylinder may be rotated into or out of the beam providing dual modes of line or dot image projection. A swivel mount is disclosed for use of the laser guideline system on saws or the like to demarcate the cut path.

11 Claims, 2 Drawing Sheets

LASER GUIDE LINE SYSTEM WITH CYLINDRICAL OPTIC ELEMENT

CROSS-REFERENCE TO RELATED APPLICATIONS

STATEMENT REGARDING FEDERALLY SPONSORED RESEARCH OR DEVELOPMENT

BACKGROUND OF THE INVENTION

The invention relates generally to instruments using a laser to produce a guideline and in particular to an improved optical system for projecting a line image.

The use of lasers to project lines on surfaces to guide construction and the like is well known. In one common system, a laser beam having a generally narrow and cylindrical cross-section is directed against an oblique rotating mirror to scan the beam through a plane. When the moving beam strikes a surface, it produces a line image. One such rotating mirror system is described in U.S. Pat. No. 4,221,483. The alignment of the mirror in this system is critical to producing a straight line and the required precision and the need for a rotating mechanism can make such systems relatively expensive and delicate.

The moving mirror may be eliminated through the use of a stationary conical mirror in which the laser beam is directed along the axis of the cone toward its apex and reflected over 360 degrees therefrom. While such conical optic systems avoid some of the costly mechanism of a rotating mirror system, conical mirrors of high accuracy are difficult and expensive to produce.

For this reason it is known to replace the conical mirror with an anamorphic diverging lens. The lens serves to expand the laser beam in one dimension only thereby producing a plane of light whose image is also a line. While such systems using a diverging lens are potentially more robust and less expensive than mirror systems, the amount of divergence achievable is far less than that obtained with the mirrors. U.S. Pat. No. 5,461,790 describing such a lens based system notes the dispersion of the beam is limited to 30 to 60 degrees, far less than the 360 degrees often attainable with a rotating mirror system. Further, although the diverging lens is more robust and less expensive than the mirror systems, the fabrication and alignment of anamorphic lenses can be difficult and expensive.

BRIEF SUMMARY OF THE INVENTION

The present invention provides a laser guideline system, a more robust and less expensive alternative to diverging lenses providing increased angular dispersion of the laser beam. In the preferred embodiment, the laser beam is directed to cross a transparent cylinder spreading it into a plane of light of approximately 140 degrees in extent. Although the applicants do not wish to be bound by a particular theory, it is believed that the cylinder provides an optical path in which the laser beam is both refracted and internally reflected to provide this wide degree of dispersion. The simple shape of this optical element lends itself to inexpensive manufacture and mounting.

Specifically, the present invention provides a laser guideline system having a solid state laser producing a beam of coherent light along a light axis and having a substantially circular cross-section. The guideline system also includes a transparent element being substantially radially symmetric about an axis of symmetry. A housing supports the transparent element in the beam of coherent light with the axis of symmetry crossing the light axis whereby the cross-section of the beam of light is expanded into a line cross-section. The optical element may be a cylinder.

Thus it is one object of the invention to employ a simple optical element for producing a line image from a laser beam that normally produces a point image. A cylindrical element is easy to manufacture by a number of processes and is naturally anamorphic across its axis. The regular shape of a cylinder allows alignment of it with the housing through the simple expedient of a precision bored hole. A cylindrical shape is naturally robust against shock across its axis.

The housing may further include a carriage movable between a first and second position, the carriage supporting the transparent element within the beam in a first position and removed from the beam in a second position.

Thus is it another object of the invention to provide a laser guideline system that permits both dot and line images to be formed.

The carriage may rotate about an axis intersecting the beam of light and support the transparent element off axis to move into and out of the beam of light with rotation of the carriage.

Thus it is another object of the invention to provide a carriage uniquely suited for a cylindrical optical element of the present invention. Because the cylindrical embodiment of the optical element is radially symmetric, it may be rotated on a carriage into the beam of the laser without concern for its precise rotational orientation.

The guide system may have at least three orthogonal outer faces and the lens element may be oriented with the axis of symmetry aligned with at least one of the outer faces. The housing may further support at least one level affixed to the housing so that orientation of a projected line from the laser guideline system may be gravitationally aligned.

Thus it is another object of the invention to provide a laser guideline system suitable for producing level lines such as may be useful in the construction industries. The simple alignment of the optical element through the use of a bored hole simplifies the construction of such an instrument.

Alternatively, the housing may include a ball joint having a ball captured by the housing and further attached to an outwardly extending arm adjustable in angle about a line perpendicular to both the light axis and the axis of symmetry. The arm may further have an attachment means to permit attachment of the arm to a saw so that the arm extends substantially along a plane of cutting of the saw.

Thus, it is another object of the invention to provide a mounting for the housing suitable for using the laser guideline system on a circular saw or the like in which the guide must be aligned in two angles to be parallel to a cutting path of the saw. The ball joint allows both types of motion in a single mechanism.

The foregoing and other objects and advantages of the invention will appear from the following description. In this description reference is made to the accompanying drawings which form a part hereof and in which there is shown by way of illustration, the preferred embodiment of the invention. Such embodiment does not necessarily represent the full scope of the invention however, and reference must be made therefore to the claims for interpreting the scope of the invention.

DETAILED DESCRIPTION OF THE INVENTION

Figure 1:
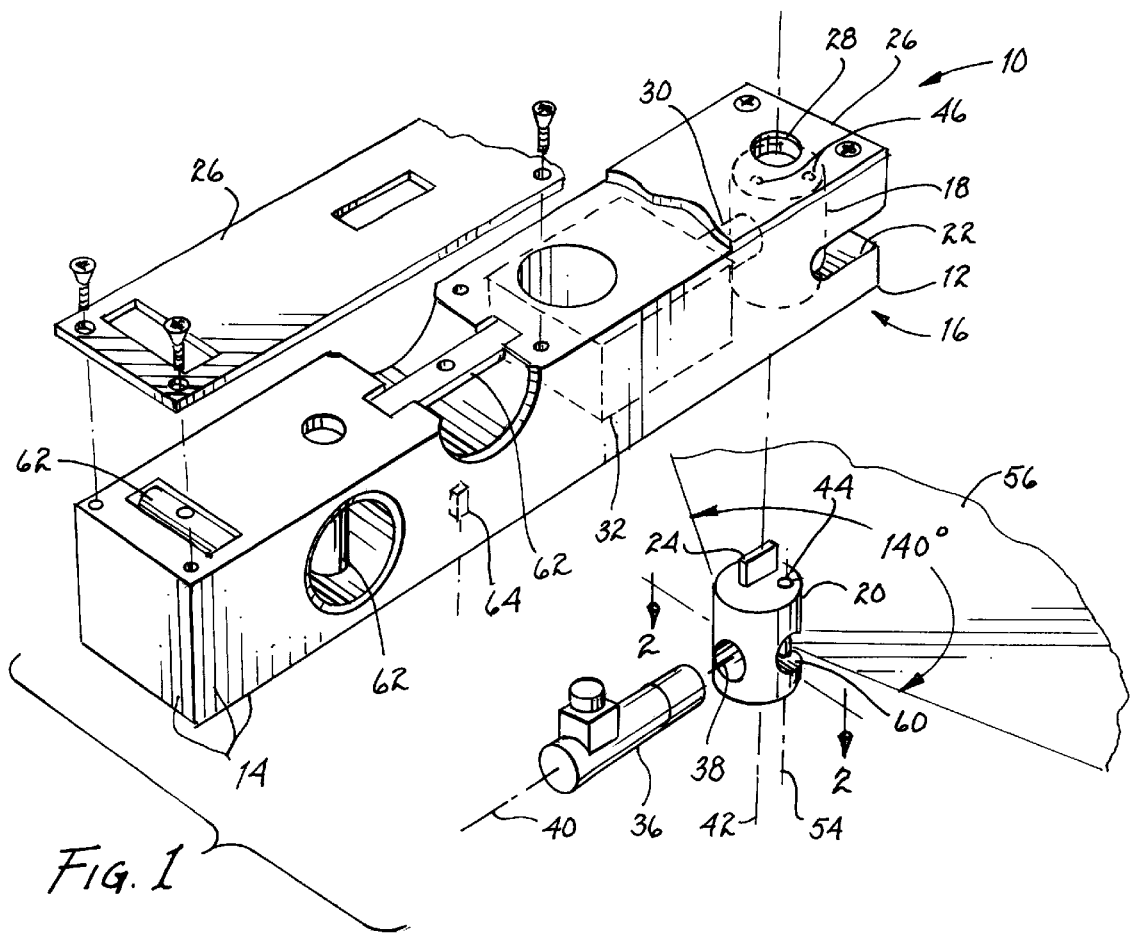
FIG. 1 is a perspective, exploded view of the laser guideline system of the present invention showing a rotating turret for positioning a cylindrical element within a path of laser beam.

Referring now to FIG. 1, a laser guideline system 10 of the present invention provides a housing 12 having an outer surface conforming generally to an elongate rectangular parallelepiped having orthogonal outer faces 14. A front end 16 of the housing 12 includes a vertically extending bore 18 receiving a cylindrical turret 20 that may rotate within the bore 18. A notch 22 is cut longitudinally in from end 16 to join with bore 18 to expose a portion of turret 20 when turret 20 is placed within bore 18.

Turret 20 includes a knob 24 extending from its upper surface. A cover plate 26 covering the top of bore 18 includes an aperture 28 aligned with the knob 24 so that with cover plate 26 in place, turret 20 is held captive in bore 18 but may be rotated by movement of the knob 24 extending through aperture 28 in cover plate 26.

Figure 3:
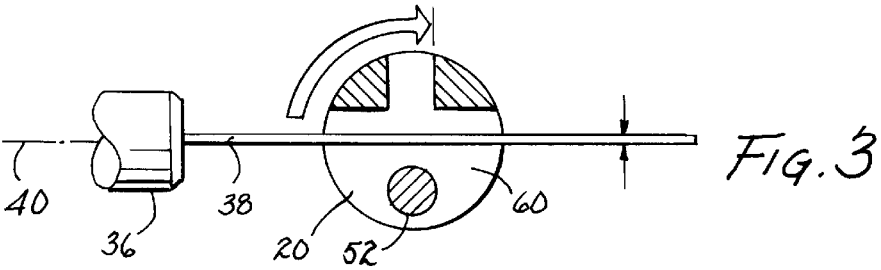
FIG. 3 is a figure similar to that of FIG. 2 showing rotation of the turret ninety degrees to position a cylindrical optical element of the present invention within the path of the laser beam to produce a plane of light.

The upper surface of the turret 20 also supports a spring loaded detent ball 44 which may be received by either of two dimples 46 formed in the undersurface of the cover plate 26 over bore 18 so that the turret 20 is detained either at a first position as shown in FIG. 1 with the detent ball 44 engaging a first of the dimples 46 or a second position shown in FIG. 3 with the turret rotated ninety degrees in a clockwise direction.

Extending rearward in a longitudinal direction from bore 18 is a channel 30 communicating with a laser chamber 32 the latter of which supports a battery powered solid state laser 36 so that a beam 38 from the laser 36 may travel along a longitudinal light axis 40 toward the turret 20 intersecting an axis of rotation 42 of the turret 20 at right angles. The laser may be a 635 nm, 5 milliwatt laser diode as are readily commercially available.

Figure 2:
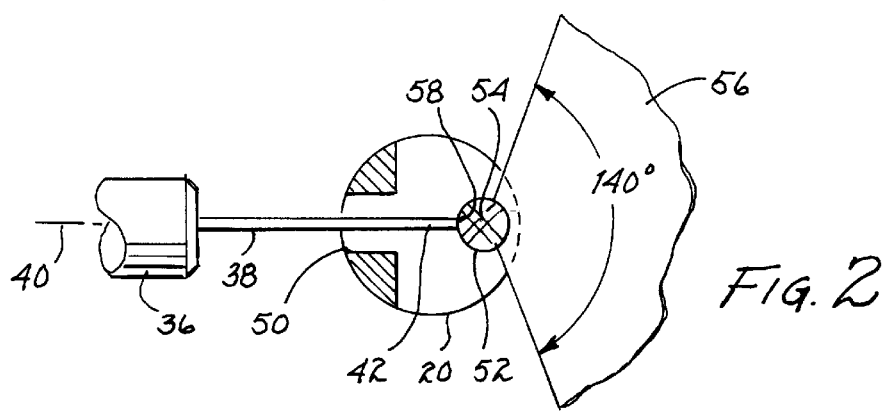
FIG. 2 is a cross-sectional view taken along line 2—2 of FIG. 1 with the turret of FIG. 1 in a first position allowing free passage of the laser beam.

Referring now to FIGS. 1 and 2, the turret 20 in the first position receives the laser beam 38 having a generally circular and narrow cross-section through an entrance aperture 50 cut laterally through the turret 20 to cross the axis of rotation 42 providing a channel for the laser beam 38 to a cylindrical optical element 52 opposed from the entrance aperture 50 across the axis of rotation 42. In the preferred embodiment, the optical element 52 is a Pyrex glass rod 2–6 in diameter, and 4 millimeters in the preferred embodiment, the rod being cylindrical in form and thus radially symmetric about an axis of symmetry 54 coincident with the primary axis of the cylinder. The optical element 52 need not be Pyrex but may be any transparent material including other glasses, crystals or plastics.

The optical element 52 is mounted so that its axis of symmetry 54 is parallel to the axis of rotation 42 and perpendicular to the light axis 40 along which beam 38 travels to intersect the axis of symmetry 54.

The effect of the optical element 52 on the laser beam 38 is to disperse the laser beam 38 to a plane of light 56 having a generally linear cross-section so as to project a line on any intersecting surface lying in a plane perpendicular to axis of symmetry 54. The angle subtended by the plane of light 56 is nominally 140 degrees, however, some line projection may be seen across an angle as much as 180 degrees with diminished intensity toward its edge. The plane of light 56 may pass freely out of the notch 22.

Turret 20 may receive optical element 52 within a precisely drilled bore 58 cut into turret 20. The plane of the sheet of light has been determined to be precisely perpendicular to the axis of symmetry 54 when the laser beam 38 is also so perpendicular. Thus it will be understood that the ability to precisely machine the bore 18, the outer surfaces of the turret 20, and to orient the bore 58 within the turret 20 with respect to the orthogonal outer face 14, guarantees accurate alignment between the plane of light 56 and the housing 12. This is desirable for laser guideline systems in which the orthogonal outer faces 14 will be positioned against a desired reference coordinate system with respect to which a line should be drawn.

It will be noted that the precise angular rotation of the turret 20 does not affect the trueness of the plane of light 56 as the optical element 52 is radially symmetric and no concern must be had as to how optical element 52 rotates as turret 20 is rotated to its position as shown in FIG. 2. Nor is this trueness affected by the rotation of the optical element 52 within bore 58 or minor up and down movement of the optical element 52 within the bore 58, because the optical element 52 is uniform in a vertical direction.

Referring now to FIG. 3, the turret 20 may be rotated clockwise by ninety degrees to move the optical element 52 out of the path of the laser beam 38, hence away from light axis 40. A channel 60 is cut in the turret 20 to allow the laser beam 38 to pass freely through the turret 20 to the notch 22 out of the laser guideline system 10. In this orientation of the turret 20, the cross-section of the beam 38 remains essentially circular to project a dot image on a remote surface.

Referring again to FIG. 1, bubble levels 62 may be mounted on the housing 12 to be mutually orthogonal and to allow for leveling of the housing 12. The bubble levels 62 are positioned with respect to the orthogonal outer faces 14 so that use of the bubble levels 62 aligns the plane of light 56 or beam 38 with respect to gravity and further allowing the laser guideline system 10 to be used as a conventional level.

A threaded mounting hole 64 may be cut into the lower orthogonal outer face 14 of the laser guideline system 10 to allow the laser guideline system 10 to be attached to a surveyor's tripod or the like for convenient use when there is no level surface on which to place the laser guideline system 10.

Figure 4:
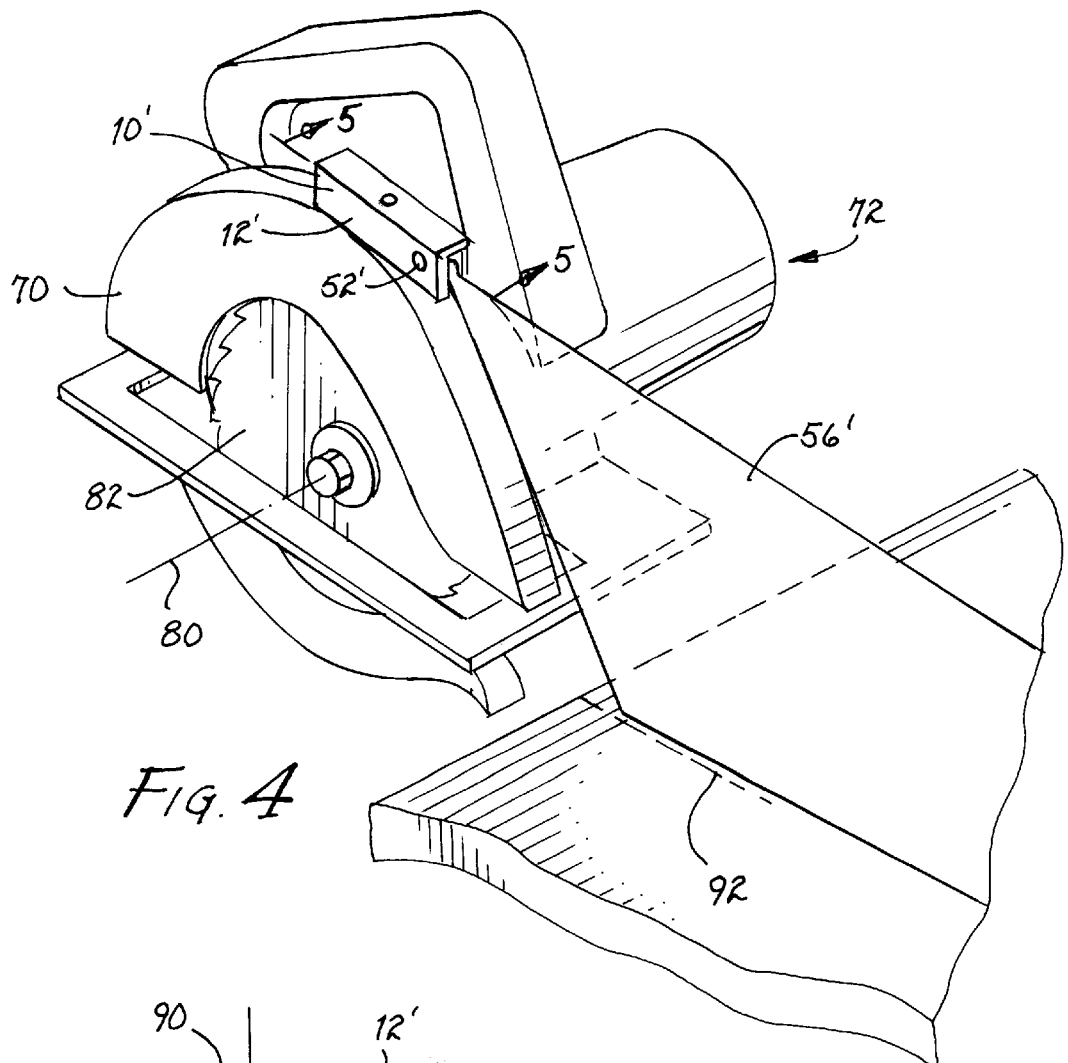
FIG. 4 is a perspective view of the present invention as mounted on the guard of a circular saw for projecting a guide line to aid in cutting.

Referring now to FIG. 4, in an alternative embodiment of the invention, a laser guideline system 10' may eliminate the bubble levels 62 and turret 20, and the laser (not shown) may project its beam toward a fixed horizontal optical element 52' to produce a generally vertical plane of light 56'.

Figure 5:
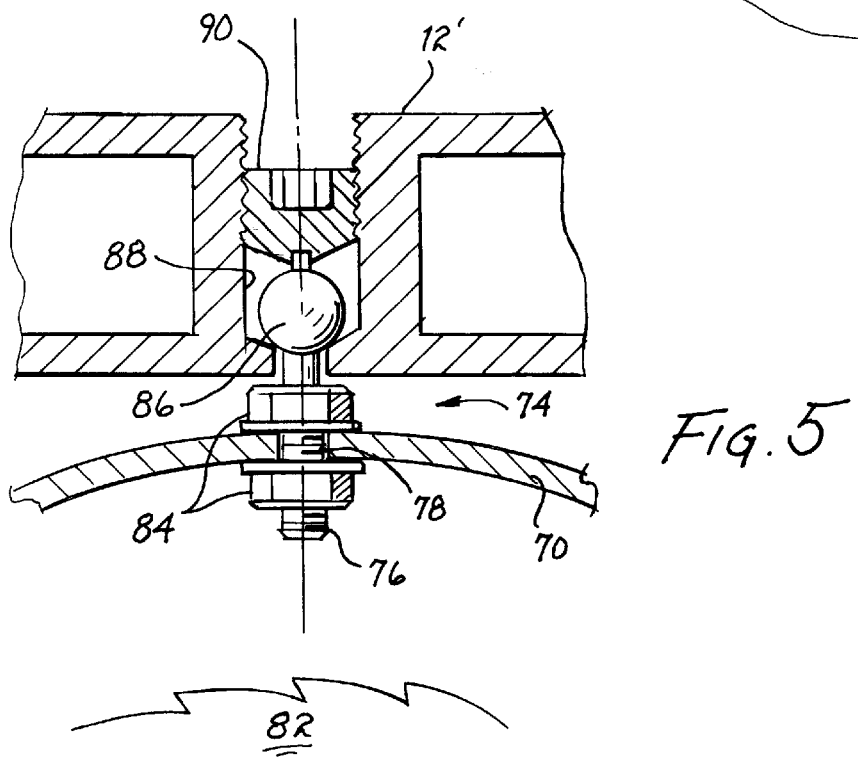
FIG. 5 is a fragmentary cross-sectional view along line 5—5 of FIG. 4 showing a ball joint used for mounting the invention to the circular saw.

Referring also to FIG. 5, the housing 12' of the laser guideline system 10' may be attached to a shroud 70 of a circular saw 72 or the like by means of a ball joint 74. An arm 76 may pass through a hole 78 cut in the shroud with the arm 76 extending radially from the axis of rotation 80 of the saw blade 82 but within the plane of the saw blade 82. Nuts 84 positioned above and below the shroud 70 engage threads on the arm 76 to attach the arm 76 firmly to the shroud 70 by sandwiching the shroud 70 between the nuts 84. Other means of attaching the arm 76 to the shroud including elements molded into the shroud 70 during manufacturing will be understood to those of ordinary skill in the art.

The upper end of the arm 76 terminates in a ball 86 held within a bore 88 of the housing 12'. The lower wall of the bore 18 is closed but for an aperture allowing exit of the arm 76. The upper walls of the bore 88 support internal threads to engage outer threads of a set screw 90 which may be tightened downward into the bore to capture the ball 86 between the upper surface of the lower walls of the bore 88 and the lower surface of the set screw 90, thus locking the orientation of the housing 12' with respect to the shroud 70 when tight but allowing rotation of the housing 12' in at least two perpendicular directions about the ball 86 when the set screw 90 is loosened, e.g., a tipping of the housing 12' forward and backwards or left and right.

Thus when the set screw 90 is loosened, the plane of light 56 may be aligned with a cut path 92 of the saw 72 generally within the plane of the blade 82 both by rotation of the housing 12' and tipping of the housing 12'. When alignment has been achieved, the set screw 90 may be tightened locking the housing 12' in place.

This description has been that of a preferred embodiment of the present invention. It will occur to those that practice the art that many modifications may be made without departing from the spirit and scope of the invention. In particular, although a cylinder is the preferred form of the optical element 52 other generally radially symmetric surfaces substantially approximately a cylinder may also be used. In order to apprise the public of the various embodiments that may fall within the scope of the invention, the following claims are made.

We claim:

1. A laser guide system comprising:
   a solid state laser producing a beam of coherent light along a light axis and having a substantially circular cross section;
   a transparent element substantially radially symmetric about an axis of symmetry; and
   a housing supporting the transparent element in the beam of coherent light with the axis of symmetry crossing the light axis;
   whereby the cross section of the beam of light is expanded int a line cross section; and wherein the housing further supports at least one level affixed to the housing so that the orientation of a projected line from the laser guide system may be gravitationally aligned.

2. The laser guide system of claim 1 wherein the line subtends an angle of no less than ninety degrees.

3. The laser guide system of claim 1 wherein the housing further supports a carriage movable between a first and second position, the carriage supporting the transparent element within the beam in the first position and removed from the beam in the second position;
   whereby both a dot image and a line image may be projected by the laser guide system.

4. The laser guide system of claim 3 wherein the carriage rotates about an axis intersecting the beam of light and supports the transparent element off axis to move into and out of the beam of light with rotation of the carriage.

5. The laser guide system of claim 3 wherein the carriage includes a detent restraining movement of the carriage when the carriage is in the first and second positions.

6. The laser guide system of claim 1 wherein the transparent element is a Pyrex rod.

7. The laser guide system of claim 1 wherein the transparent element is a cylinder.

8. The laser guide system of claim 1 wherein the housing includes three mutually orthogonal levels.

9. The laser guide system of claim 1 wherein the housing has at least three orthogonal outer faces and the lens element is oriented with the axis of symmetry aligned with at least one outer face.

10. The laser guide system of claim 1 wherein the housing includes mounting means for attaching the housing to a tripod base.

11. The laser guide system of claim 1 wherein the housing includes a ball joint having a ball captured by the housing and further attached to an outwardly extending arm adjustable in angle about a line perpendicular to both the light axis and the axis of symmetry, the arm further having attachment means to permit attachment of the arm to a saw to extend substantially along a plane of cutting of the saw.

* * * * *